United States Patent [19]

Kamata

[11] Patent Number: 5,285,229
[45] Date of Patent: Feb. 8, 1994

[54] LENS-FITTED PHOTOGRAPHIC FILM PACKAGE

[75] Inventor: Kazuo Kamata, Tokyo, Japan

[73] Assignee: Fuji Photo Film Co., Ltd., Kanagawa, Japan

[21] Appl. No.: 44,038

[22] Filed: Apr. 8, 1993

[30] Foreign Application Priority Data

Apr. 9, 1992 [JP] Japan .................................. 4-89029
Apr. 15, 1992 [JP] Japan .................................. 4-95488

[51] Int. Cl.$^5$ .................. G03B 17/02; B65D 17/52; B65D 41/16
[52] U.S. Cl. ............................... 354/288; 220/284; 220/306
[58] Field of Search ................ 354/288; 220/284, 326, 220/306

[56] References Cited

U.S. PATENT DOCUMENTS

| Re. 34,168 | 1/1993 | Ohmura et al. | 354/288 X |
| 4,905,861 | 3/1990 | Boxall et al. | 220/306 X |
| 4,995,513 | 2/1991 | Rosler | 220/306 X |
| 5,126,775 | 6/1992 | Nakai et al. | 354/288 |
| 5,170,199 | 12/1992 | Nokai et al. | 354/288 X |

Primary Examiner—Michael L. Gellner
Assistant Examiner—Jae N. Noh
Attorney, Agent, or Firm—Young & Thompson

[57] ABSTRACT

First and second parts of a lens-fitted photographic film package are fastened to each other through engagement between hooks and engaging portions which are formed integrally on the first part and the second part, respectively. Holes are formed at the root of the hooks. Each hook is formed with a projection having a sloping surface which extends from the root of the hook toward an engaging surface of the hook and is inclined in a direction to occupy the space behind the hole. A stick-like tool is inserted into the hole in the direction in which the first part is pushed onto the second part to assemble the parts. The tool pushes the hook by sliding along the sloping surface of the projection and bends the hook in a direction to disengage the engaging surface of the hook from the engaging portion.

14 Claims, 8 Drawing Sheets

LENS-FITTED PHOTOGRAPHIC FILM PACKAGE

BACKGROUND OF THE INVENTION

1. Field of the Invention

The present invention relates to a lens-fitted photographic film package, and more particularly to a construction for securing together the components of the lens-fitted photographic film package, which facilitates disassembly of the lens-fitted photographic film package.

2. Related Art

Lens-fitted photographic film packages (hereinafter referred to as film packages) are now on the market, for example, under a trademark "Quick Snap", which are a single-use camera pre-loaded with photographic film. The film packages make it possible to take pictures whenever desired without buying or carrying an expensive and heavy camera.

The film package comprises a front cover section 1, a main body section 2, and a rear cover section 3, as shown in FIG. 7. The main body section 2 accommodates an exposed film 4 which is previously pulled out from a film container 4a and is wound in a roll. A shutter cover member 5 for mounting a taking lens 9 is fixedly attached to the front of the main body section 2. When a shutter release button 6 is depressed, an exposure mechanism including a shutter actuating lever 7 and a shutter blade 8 is released from a cocked position to expose the film 4 to light passing through the taking lens 9.

When assembling the film package, the main body section 2, in which the exposure mechanism and film winding mechanism are incorporated and the unexposed film 4 and the film container 4a are accommodated, is closed by the rear cover section 3 in a light-tight fashion. The shutter cover member 5 for mounting a taking lens 9 is fixedly attached to the front of the main body section 2. Thereafter, the front cover section 1 is fixedly attached to the front of the main body section 2.

These parts may be permanently secured to each other, for example, by ultrasonic welding. But recently, the parts have been more usually assembled by snap-in engagement with each other, because this method is advantageous in view of the cost and the efficiency of assembly.

For example, a pair of hooks 10 are formed integrally on the shutter cover member 5, and a pair of engaging portions 11 are formed on the main body section 2, so that the shutter cover member 5 can be fastened to the main body section 2 by engaging the hooks 10 with the engaging portions 11, as shown in FIG. 8. Similarly, as is shown in FIG. 9, the front cover section 1 is fastened to the main body section 2 through engagement between hooks 16 and 17 which are formed integrally on the front cover section and the main body section 2, respectively.

Engaging surfaces 10a and 11a of the hooks 10 and the engaging portions 11 are substantially perpendicular to a direction A in which the shutter cover member 5 is attached to or detached from the main body section 2. Engaging surfaces 16a and 17a of the hooks 16 and 17 are also substantially perpendicular to the direction A.

A snap-in type bottom lid 3a is formed on the rear cover section. The bottom lid 3a is pried open by a photofinisher, to remove the film container 4a containing exposed photographic film therein from the film package.

Meanwhile, for environmental protection and the recycling of industrial waste, the reuse of the film packages should be affirmatively promoted, instead of simply throwing them away after the exposed photographic films have been removed therefrom for development and printing. To recover the bodies of the used film packages, they must be disassembled and the individual parts sorted according to their materials. To disassemble the bodies, it is necessary to disengage the parts from one another.

Conveniently, this disengagement process is carried out by hand. For instance, when the shutter cover member 5 or the front cover section 1 is removed from the main body section 2, a tool, such as a stick or screw driver is inserted into a hole 12 or 15, and the hook 10 or 16 is bent by the tool in a direction transverse to the direction A, so as to separate the engaging surface 10a or 16a from the engaging surface 11a or 17a, respectively. The holes 12 and 15 originally served as holes allowing removal of the molds for forming the engaging surfaces 10a and 16a by molding.

However, according to the above-described conventional arrangements, it is necessary to move the tool first in the direction A and then in a direction transverse to the direction A, as indicated by arrows shown by chain-dotted lines in FIGS. 8 and 9. This is cumbersome and reduces the efficiency of disassembly. Furthermore, the hooks 10 and 16 are frequently broken when bent by the tool, because the hooks 10 and 16 can be bent unnecessarily far. The shutter cover member 5 with the hook 10 broken or the front cover section 1 with the hook 16 broken cannot be directly reused as a part of a new film package.

Although it is desirable to automate the disassembly process, a complicated and hence expensive mechanism would be necessary for automatically moving the tool in the above-described manner. Moreover, because the depth of insertion of the tool into the holes should be limited, such an automatic disassembly mechanism requires high accuracy in positioning the workpieces and in other operations. This further increases the cost of disassembling the film packages.

OBJECTS OF THE INVENTION

In view of the foregoing, an object of the present invention is to provide a film package having a construction for securing together its components, which permits securely fastening necessary parts of the film package to one another, and efficiently disassembling the film package, while preventing the parts from being broken.

A further object of the present invention is to provide a film package having a construction for securing together its components, which permits inexpensive automatic disassembly of the film package.

SUMMARY OF THE INVENTION

To achieve the above and other objects and advantages, the present invention provides a projection on a hook. Each projection has a sloping surface extending from the root of the hook toward an engaging surface of the hook, this surface being inclined in a direction to occupy a space behind a hole which is formed at the root of the hook.

According to the present invention, the hook is bent in a direction to separate the engaging surface of the hook from an engaging surface of an engaging portion, which is engaged with the hook, merely by pushing the hook in a single direction by sliding engagement of a tool along the sloping surface of the projection.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENTS

Figure 7:
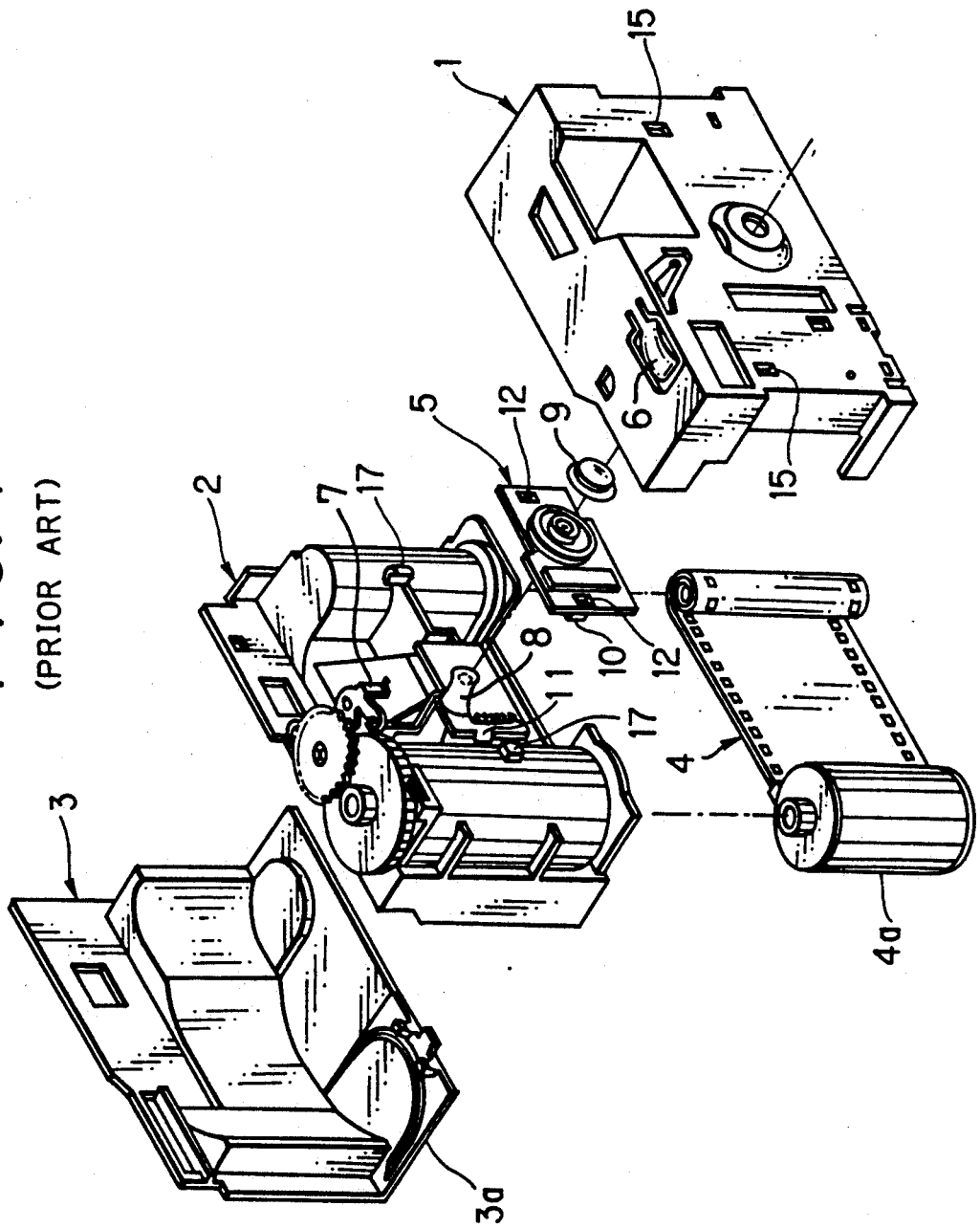
FIG. 7 is an exploded perspective view showing a conventional film package.
Figure 8:
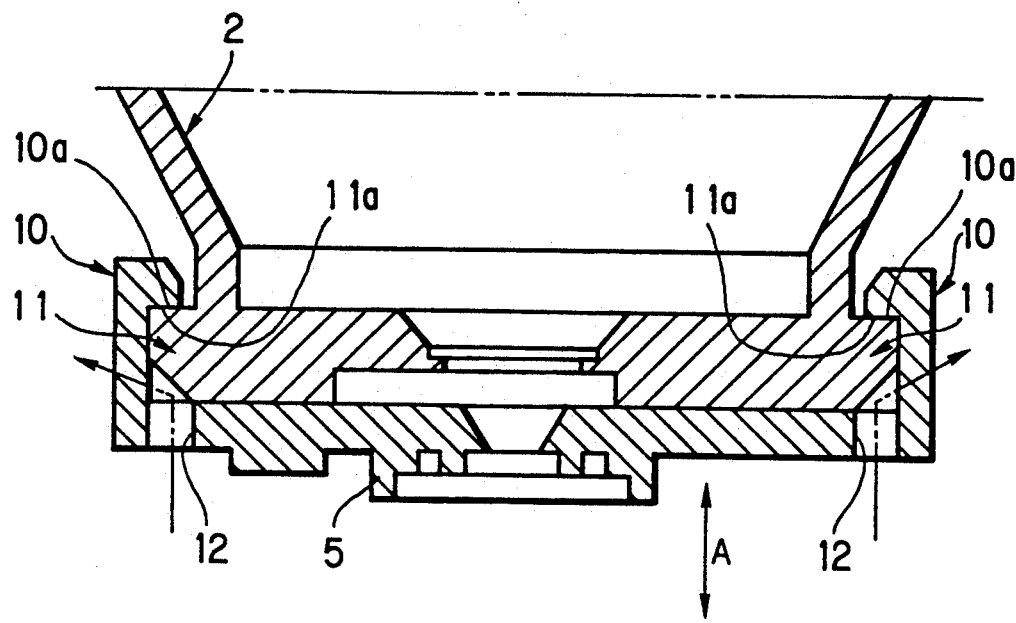
FIG. 8 is a fragmentary horizontal sectional view, illustrating a conventional detachable securement between a shutter cover member and a main body section of the conventional film package of FIG. 7.
Figure 9:
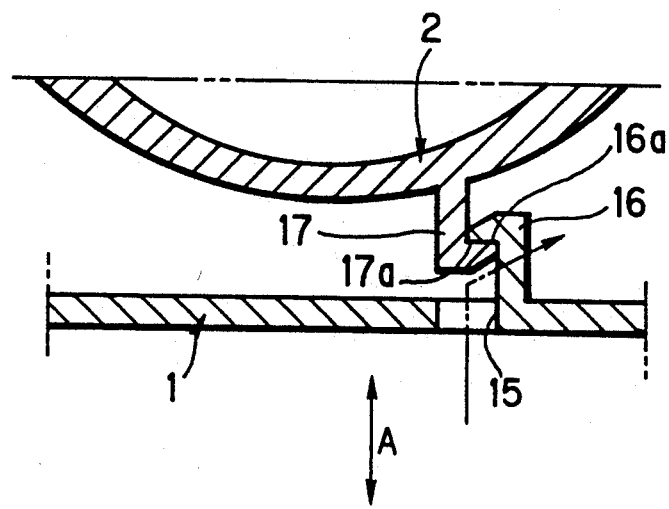
FIG. 9 is a fragmentary horizontal sectional view, illustrating a conventional detachable securement between a front cover section and the main body section of the conventional film package of FIG. 7.

While the present invention may be used in any type of film package, it will be specifically described in connection with its application to a film package having a construction similar to the conventional film package illustrated in FIG. 7. Therefore, the description of the corresponding parts of the preferred embodiment is omitted for brevity, and the embodiment will be described only with respect to those parts which are essential to the present invention, using the same reference numerals as in FIG. 7, to designate the corresponding parts.

Figure 1:
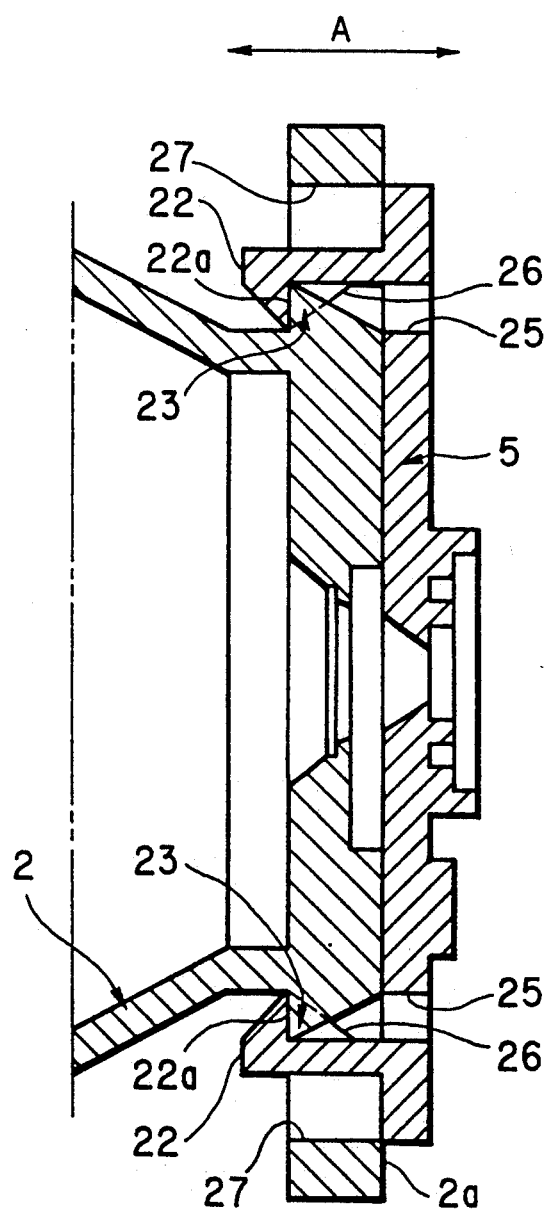
FIG. 1 is a fragmentary horizontal sectional view of a film package, illustrating a detachable securement between a shutter cover member and a main body section according to a first embodiment of the invention.
Figure 2:
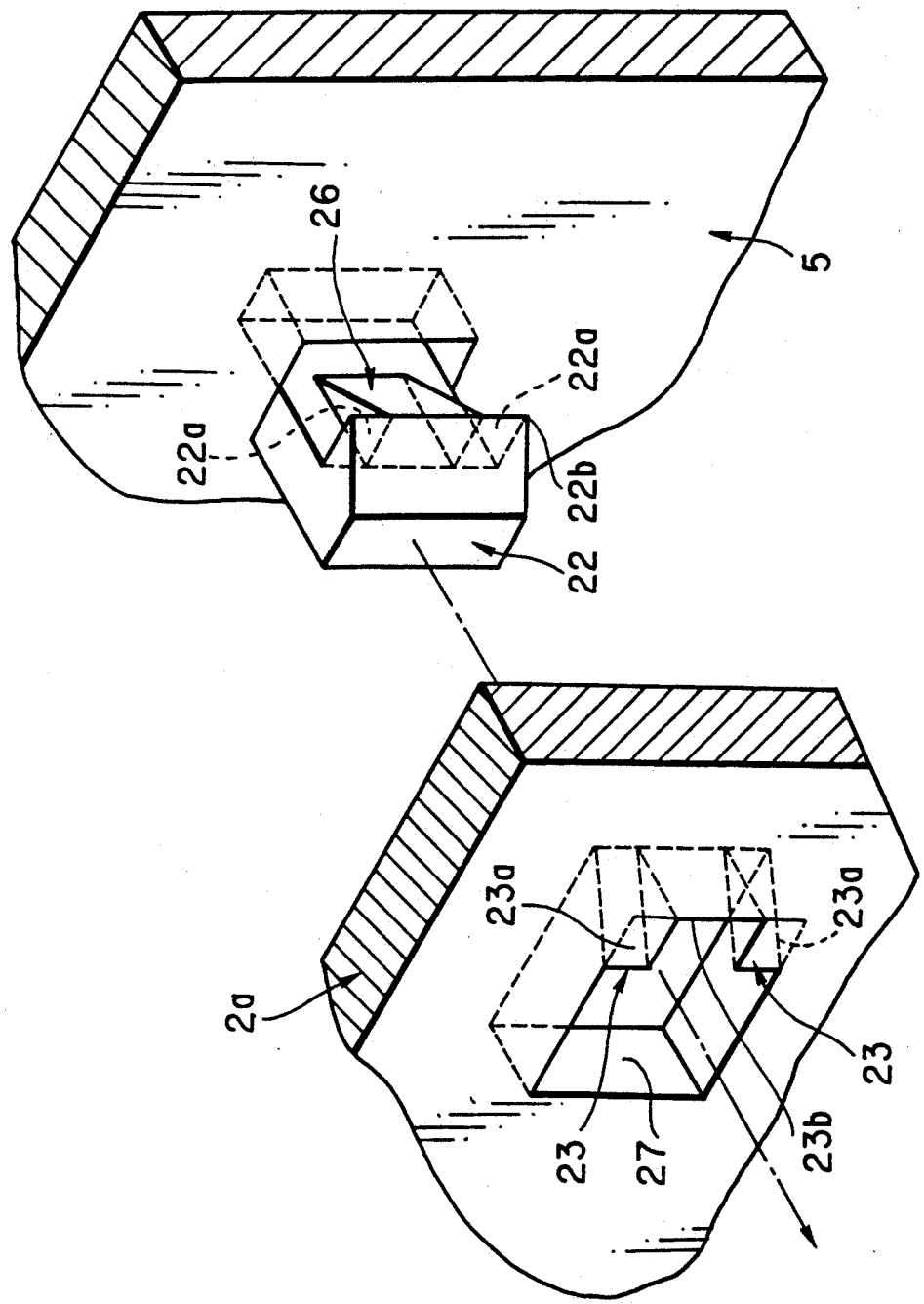
FIG. 2 is an exploded fragmentary perspective view of the detachable securement of the embodiment shown in FIG. 1.
Figure 3:
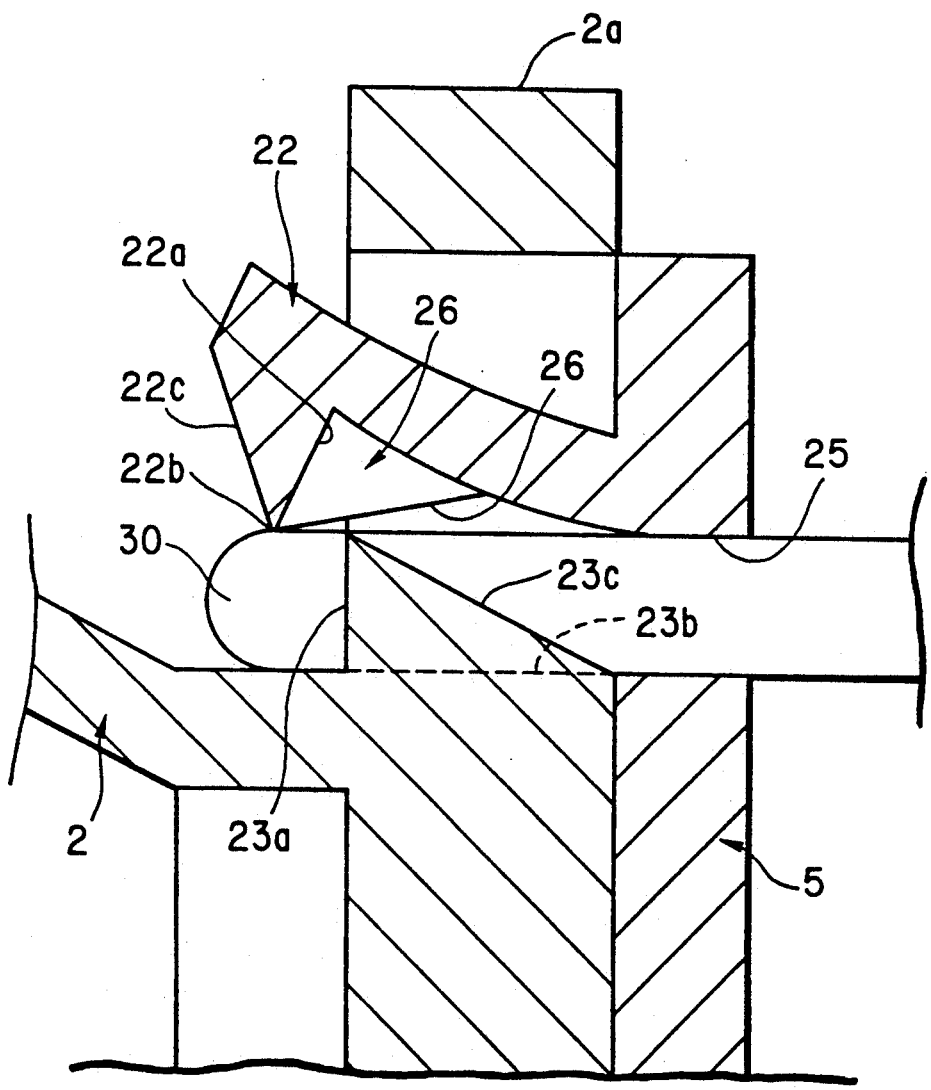
FIG. 3 is an enlarged horizontal sectional view of the embodiment shown in FIG. 1, in the disengaged state.

FIGS. 1 to 3 show a first embodiment of the present invention. A shutter cover member 5 has a pair of hooks 22 which are formed integrally therewith and disposed on opposite horizontal sides thereof. A main body section 2 has a pair of engaging portions 23 formed integrally therewith. The engaging portions 23 have engaging surfaces 23a, which are brought into engagement with engaging surfaces 22a of the hooks 22 when the shutter cover member 5 is attached to the main body section 2. In FIG. 1, an arrow A indicates the direction in which the shutter cover member 5 is moved so as to be attached to or detached from the main body section 2. The hooks 22 protrude from the shutter cover member 5 in a direction substantially parallel to the direction A, and the engaging surfaces 22a and 23a are substantially perpendicular to the direction A. Thereby, the shutter cover member 5 is prevented from moving in the direction A after the engaging surfaces 22a are in contact with the engaging surfaces 23a.

The shutter cover member 5 is formed with holes 25. The holes 25 are each disposed at the root of the hook 22 in a position overlying the engaging surface 22a. The holes 25 are initially used to remove molds for forming the engaging surfaces 22a, after the hooks 22 are formed integrally with the shutter cover member 5 by molding. For this purpose, the width or the horizontal length of the holes 25 is at least equal to the height of the engaging surfaces 22a, that is, the length from the root to the free edge 22b of the engaging surface 22a.

Each hook 22 has a projection 26 formed integrally therewith, as shown in FIG. 2. The projection 26 has a sloping surface 26a which extends diagonally from the free edge 22b of the engaging surface 22a toward the hole 25. The vertical extent of the projection 26 as seen in FIG. 2, which is to say its width, is less than the vertical extent of the hook 22. Moreover, the projection 26 is vertically centered relative to surface 22a, with the result that the engaging surface 22a is separated into two vertically spaced portions, by the projection 26, these portions being disposed on opposite vertical sides of the projection 26.

On their sides opposite projections 26, the hooks 22 have sloping surfaces 22c which allow the hooks 22 to slide over and snap behind the engaging portions 23 when the hooks 22 are pushed against the engaging portions 23 in a direction to attach the shutter cover member 5 to the main body section 2. Each engaging portion 23 has a cut-out 23b which divides the engaging surface 23a into two parts, such that the projection 26 fits into the cut-out 23b. The engaging portions 23 also have sloping surfaces 23c along which the free edges 22b of the engaging surfaces 22a slide to surmount the engaging portions 23.

The engaging portions 23 are each disposed at an edge of a rectangular opening 27 formed in a front wall portion 2a of the main body section 2. However, it is possible to dispose the engaging portions 23 at both horizontal edges of the front wall portion 2a.

When removing the shutter cover member 5 from the main body section 2, a tool is pushed into the hole 25 in the direction A, thereby to push aside the hook 22 by sliding along the sloping surface 26a of the projection 26. As a result, the hook 22 is resiliently bent in a direction to separate the engaging surface 22a from the engaging surface 23a (FIG. 3).

The recycling of the above-described film package is effected as follows:

After exposure of all the frames of the photographic film 4, the film package is forwarded to a photofinisher. At the photofinisher, the film container 4a containing the exposed film is removed from the package body, by prying open a snap-in type bottom lid 3a. Thereafter, the exposed film is subjected to development and printing as is conventional. The developed film and finished prints are returned to the customer. The empty package body is retrieved by the manufacturer.

The retrieved package body is subjected to a disassembly process. For example, the shutter cover member 5 is automatically detached from the main body section 2 using an apparatus having a pair of sticks 30 whose tips are rounded, as shown in FIG. 3. The sticks 30 are spaced from each other by the same distance as the holes 25. The sticks 30 are movable back and forth in the direction A, relative to the package body to be disassembled. The maximum diameter of the stick 30 is slightly less than the width, that is, the horizontal length of the hole 25. Because the width of the hole 25 is at least equal to the height of the engaging surfaces 22a, the maximum diameter o the stick 30 may be at least equal to the distance by which the engaging surfaces 22a overlap the engaging surfaces 23a. In the preferred embodiment shown in FIG. 3, the maximum diameter of the stick 30 is slightly greater than the width of engagement between the engaging surfaces 22a and 23a.

When the sticks 30 are inserted into the holes 25, the sticks 30 contact the sloping surfaces 26a of the projections 26. Therefore, by pushing the sticks 30 farther into the holes 25, the hooks 22 are resiliently bent to leave the engaging portions 23. Thereafter, when the sticks 30 are sufficiently inserted into the holes 25 to reach a position as shown in FIG. 3, then the hooks 22 are bent to such an extent that the engaging surfaces 22a just clear the engaging surfaces 23a in the direction A. Thereby, it becomes possible to remove the shutter cover member 5 from the main body section 2 with ease.

In this way, the hooks 22 are prevented from being bent excessively. Rather, the hooks 22 are bent by the minimum amount necessary for the hooks 22 and engaging portions 23 to clear each other. Therefore, the breakage of the hooks 22 is prevented, even when the shutter cover member 5 is used repeatedly.

Furthermore, because the direction to remove the shutter cove remember 5 form the main body section 2 is identical to the direction to retract the sticks 30 from the holes 25, and because the sticks 30 are pressed by the hooks 22 against the inner walls of the holes 25 due to the resiliency of the hooks 22, it is possible to remove the shutter cover member 5 with the sticks 30 inserted in the holes 25 merely by moving the sticks 30 backward, that is, in a direction opposite to the direction of insertion thereof. Therefore, the automatic disassembly apparatus may be simple in construction. In addition, because it is unnecessary to position the sticks 30 in the holes 25 with great accuracy, the automatic disassembly apparatus can be provided at a low cost.

When attaching a used shutter cover member 5 to a used main body section 2 for reuse, the shutter cove remember 5 is positioned in front of the main body section 2 and then pushed against the main body section 2, whereby the hooks 22 are brought into snap-in engagement behind the engaging portions 23.

Although the top of the projection 26 of the hook 22 is coincident with the tree edge 22b of the engaging surface 22a, and hence equal in height to the free edge 22b of the engaging surface 22a in the above-described embodiment, it is possible to make the surfaces 22c and 26a of different heights.

It is also possible to separate the top of the projection 26 from the free edge 22b in the direction A. With this modification, the distance of insertion of the stick 30 necessary for the disengagement is reduced.

Furthermore, instead of a single projection 26 disposed in the center of the engaging surface 22a, several projections may be provided on opposite vertical sides of the engaging surface 22a. In that case, the engaging surface 23a of the engaging portion 23 will be modified correspondingly.

Figure 4:
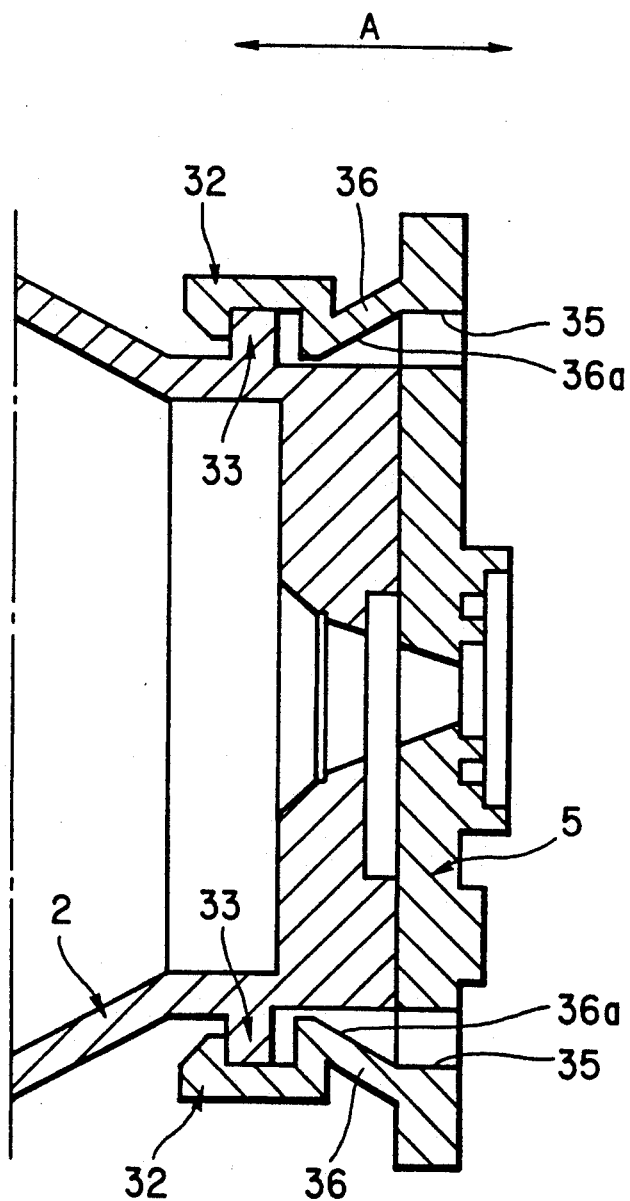
FIG. 4 is a view similar to FIG. 1, but illustrating a second embodiment of the invention.
Figure 5:
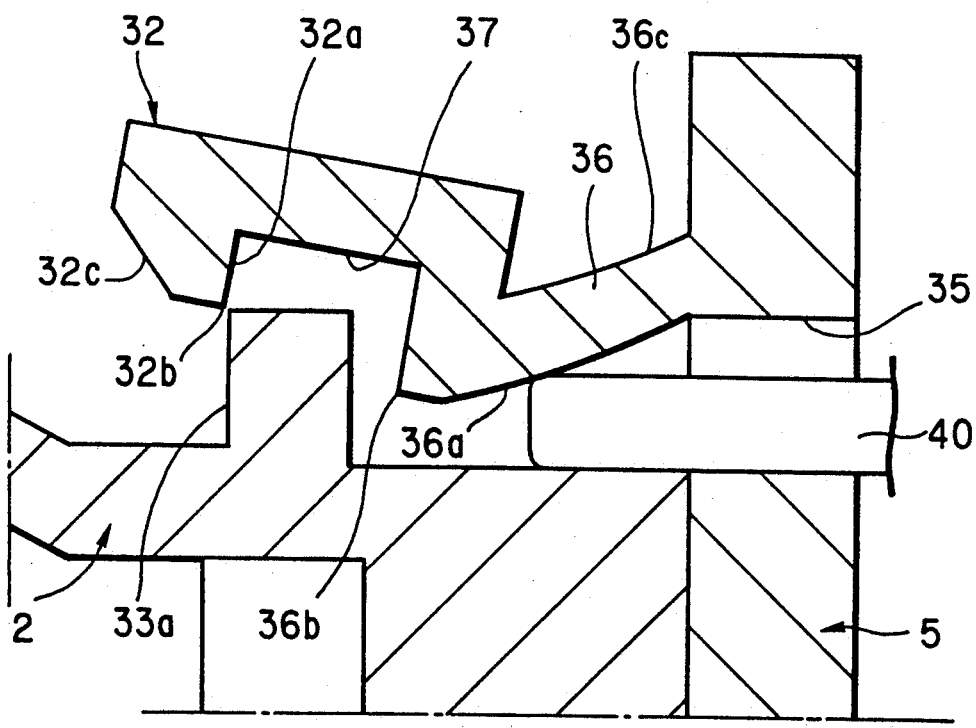
FIG. 5 is a view similar to FIG. 3 but of the embodiment of FIG. 4.
Figure 6:
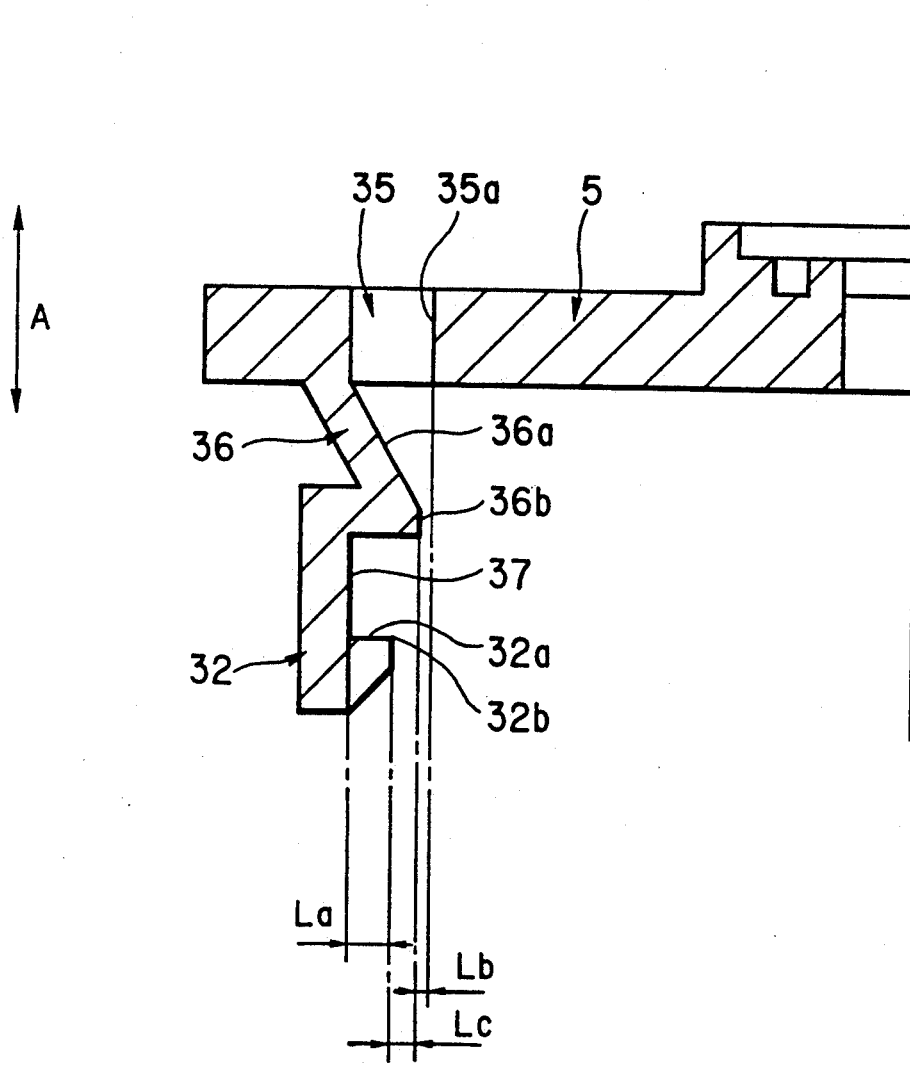
FIG. 6 is a fragmentary horizontal sectional view of a shutter cover member having a hook according to the embodiment shown in FIG. 4.

Referring now to FIGS. 4 to 6, another embodiment of the present invention will be described, wherein like or corresponding parts are designated by the same reference numerals as used in the above-described embodiment.

A shutter cover member 5 has a pair of hooks 32 which are formed integrally therewith and disposed on both horizontal sides thereof. A main body section 2 has a pair of engaging portions 33 formed integrally therewith. The engaging portions 33 have engaging surfaces 33a, which contact engaging surfaces 32a of the hooks 32 when the shutter cover member 5 is attached to the main body section 2. In FIGS. 4 and 6, an arrow A indicates the direction in which the shutter cove remember 5 is moved so as to attach it to or detach it from the main body section 2, and the engaging surfaces 32a and 33a are substantially perpendicular to the direction A. Free ends of the hooks 32 have sloping surfaces 32c for allowing the hooks 32 to slide over the engaging portions 33.

The shutter cover member 5 is formed with holes 35. The holes 35 are each disposed at the root of the hook 32 in a position overlying the engaging surface 32a. Each of the hooks 32 has a projection 36 formed integrally therewith. The projections 36 have each a sloping surface 36a extending from the hole 35 toward the engaging surface 32a in a direction to occupy a space behind the hole 35. To facilitate the bending of the hooks 32, each hook 32 has a V-shaped concavity 36c in the opposite side from the slope 36a of the projection 36.

A space 37 is provided between the projection 36 and the engaging surface 32a, for accommodating the engaging portion 33. That is, when the shutter cover member 5 is attached to the main body section 2, the engaging portions 33 are received in the spaces 37, while the engaging surfaces 33a of the engaging portions 33 tightly contact the engaging surfaces 32a of the hooks 32.

If La indicates the horizontal distance by which the engaging surfaces 32a overlap the engaging surfaces 33a, and Lc indicates the horizontal distance from the top 36b of the projection 36 to the free edge 32b of the engaging surface 32a, the values La and Lc are predetermined as follows: $0 \leq Lc < La$.

It is to be noted that the holes 35 may also first be used to remove a mold for forming the engaging surfaces 32a. At that time, the width or the horizontal length of the holes 35 should be approximately at least equal to the height or the horizontal length of the projection 36.

When removing the shutter cover member 5 from the main body section 2, a tool is pushed into the hole 35 in the direction A, thereby to push aside the hook 32 while sliding along the sloping surface 36a of the projection 36. As a result, the hook 32 is resiliently bent in a direction to disengage the engaging surface 32a from the engaging surface 33a.

For example, a stick 40 as shown in FIG. 5 is preferably used as the tool. The diameter of the stick 40 should be at least equal to the width of engagement La between the engaging surfaces 32a and 33a. By inserting the stick 40 into the hole 35 along an inner wall 35a of the hole 35 which is opposed to the hook 32, the stick 40 may be smoothly inserted without the danger of displacement. At that time, the diameter of the stick 40 should be at least equal to a length La+Lb, Lb being the horizontal distance from the top 36b of the projection 36 to the edge 35a of the hole 35.

When the hook 32 is bent by the stick 40 to a position wherein the engaging surface 32a clears engaging surface 33a, it becomes possible to detach the shutter cover member 5 from the main body section 2. Because the height of the projection 36 is at least equal to the height of the engaging surface 32a, the distance of insertion of the stick 40 into the hole 35 which is necessary for the disengagement of the engaging surface 32a from the engaging surface 33a can be small.

The recycling process of the film package having the just described fixing mechanism may be equivalent to the first embodiment. Also an automatic disassembling apparatus having a pair of sticks, which are movable back and forth in the direction A relative to the film package, is applicable to the disassembly of the film package of the second embodiment, by determining the size of the sticks correspondingly.

Although the present invention has been described in detail above with reference to preferred embodiments shown in the drawings, the present invention is not limited to the construction for securing together the shutter cover member 5 and the main body section 2. The present invention is applicable to the similar constructions effecting securement between any parts of the film package. It is, of course, possible to dispose the pair of securement constructions in a vertical direction, wherein the size of each portion should be determined correspondingly with respect to the vertical direction, instead of the horizontal direction.

Thus, it will be understood that various modifications can be effected within the scope and spirit of the invention as claimed in the appended claims.

What is claimed is:

1. A lens-fitted photographic film package which is pre-loaded with film and has an exposure mechanism said lens-fitted photographic film package comprising:
   a hook having a first engaging surface, said hook being formed integrally on a first part of said lens-fitted photographic film package and extending substantially parallel to first direction, and said first engaging surface extending substantially perpendicular to said first direction;
   an engaging portion formed on a second part of said package, said engaging portion having a second engaging surface which engages with said first engaging surface when said first part is joined to said second part by pushing said first part toward said second part in said first direction;
   a hole formed in said first part at a root of said hook in a position overlying said first engaging surface; and
   a projection formed on said hook, said projection having a sloping surface which extends from said root of said hook toward said first engaging surface to occupy a space behind said hole;
   whereby said first engaging surface can be disengaged from said second engaging surface by inserting a tool in said hole and by pushing said tool along said sloping surface in said first direction.

2. A lens-fitted photographic film package as recited in claim 1, wherein a free end of said hook is diagonally tapered on a side of said free end opposite to said first engaging surface.

3. A lens-fitted photographic film package as recited in claim 1, wherein said opening is at least equal in size to said first engaging surface.

4. A lens-fitted photographic film package as recited in claim 3, in combination with a said tool, wherein said tool has a diameter at least equal to a length over which said first engaging surface is engaged with said second engaging surface.

5. A lens-fitted photographic film package as recited in claim 1, wherein said projection is at least equal to said first engaging surface in height.

6. A lens-fitted photographic film package as recited in claim 1, wherein said hole is adapted to be used to remove a mold for forming said first engaging surface integrally with said first part.

7. A lens-fitted photographic film package as recited in claim 1, wherein said projection is triangular, and arises from said first engaging surface.

8. A lens-fitted photographic film package as recited in claim 1, wherein said engaging portion further has a cut-out extending through said second engaging surface, for receiving said projection.

9. A lens-fitted photographic film package as recited in claim 8, wherein said projection is disposed centrally of said first engaging surface.

10. A lens-fitted photographic film package as recited in claim 9, wherein a top of said projection is coplanar with said first engaging surface.

11. A lens-fitted photographic film package as recited in claim 1, wherein said hook further has a space between said first engaging surface and said projection, for accommodating said engaging portion.

12. A lens-fitted photographic film package as recited in claim 11, wherein said hook further has a V-shaped concavity formed in an area opposite to said slope of said projection, so as to facilitate bending of said hook.

13. A lens-fitted photographic film package which is pre-loaded with film and has an exposure mechanism, said lens-fitted photographic film package comprising:
   a hook having an engaging surface, said hook being formed integrally on a first part of said lens-fitted photographic film package;
   a hole formed in said first part at a root of said hook in a position overlying said engaging surface; said hold being at least equal in size to said engaging surface;
   a projection formed on said hook said projection having a sloping surface which extends from a top edge of said engaging surface toward said hole; and
   an engaging portion formed in a second part of said lens-fitted photographic film package, said engaging portion being engaged with said engaging surface of said hook when said first part is joined to said second part by movement in one direction;
   whereby said hook can be disengaged from said engaging portion by inserting a tool through said hole in said one direction and pushing with said tool on said sloping surface.

14. A lens-fitted photographic film package which is pre-loaded with film and has an exposure mechanism, said lens-fitted photographic film package comprising:
   a hook having a first engaging surface, said hook being formed integrally on a first part of said lens-fitted photographic film package;
   an engaging portion formed on a second part of said lens-fitted photographic film package, said engaging portion having a second engaging surface which engages with said first engaging surface of said hook when said first part is joined to said second part;
   a hole formed in said first part at a root of said hook in a position overlying said first engaging surface;
   a projection formed on said hook, said projection having a sloping surface which extends from said hole toward said first engaging surface and which is inclined in a direction to overlie said hole;

there being a space between said first engaging surface and said projection, for receiving said engaging portion therein, such that said first engaging surface is in contact with said second engaging surface;

whereby said projection is adapted to be pushed by a tool inserted into said hole, so as to bend said hook to disengage said first engaging surface from said second engaging surface.

* * * * *